(12) United States Patent
Gao (10) Patent No.: US 7,983,903 B2
(45) Date of Patent: Jul. 19, 2011

(54) MINING BILINGUAL DICTIONARIES FROM MONOLINGUAL WEB PAGES

(75) Inventor: Jianfeng Gao, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 11/851,402

(22) Filed: Sep. 7, 2007

(65) Prior Publication Data

US 2009/0070095 A1 Mar. 12, 2009

(51) Int. Cl.
- G06F 17/21 (2006.01)
- G06F 17/28 (2006.01)
- G06F 17/20 (2006.01)

(52) U.S. Cl. ............... 704/10; 704/2; 704/7; 704/8

(58) Field of Classification Search ............... None
See application file for complete search history.

(56) References Cited

U.S. PATENT DOCUMENTS

| | | | |
|---|---|---|---|
| 6,006,221 A | 12/1999 | Liddy et al. | |
| 6,064,951 A | 5/2000 | Park et al. | |
| 6,604,101 B1 | 8/2003 | Chan et al. | |
| 6,885,985 B2 | 4/2005 | Hull | |
| 7,047,182 B2 | 5/2006 | Masuichi | |
| 7,249,013 B2 | 7/2007 | Al-Onaizan et al. | |
| 7,620,538 B2 * | 11/2009 | Marcu et al. | 704/2 |
| 7,853,444 B2 * | 12/2010 | Wang et al. | 704/2 |
| 2003/0204400 A1 | 10/2003 | Marcu et al. | |
| 2003/0233222 A1 | 12/2003 | Soricut et al. | |
| 2005/0125215 A1 | 6/2005 | Wu et al. | |
| 2005/0216253 A1 * | 9/2005 | Brockett | 704/5 |
| 2006/0173886 A1 | 8/2006 | Moulinier et al. | |
| 2007/0129935 A1 | 6/2007 | Uchimoto et al. | |
| 2008/0221866 A1 * | 9/2008 | Katragadda et al. | 704/8 |

OTHER PUBLICATIONS

Kuo, J. et al. "Learning transliteration lexicons from the web," 21st Int'l Conf. on Computational Linguistics, pp. 1129-1136, Jul. 2006.*
Jiang, L. et al. "Named entity translation with web mining and transliteration," Proceedings of the 20th international joint conference on Artifical intelligence, Hyderabad, India, pp. 1629-1634, Year of Publication: 2007.*
Koehn, P. et al. "Learning a translation lexicon from monolingual corpora," Jul. 2002, pp. 9-16 Unsupervised Lexical Acquisition: Proceedings of the Workshop of the ACL Special Interest Group on the Lexicon (SIGLEX), Philadelphia.*

(Continued)

*Primary Examiner* — Matthew J Sked
(74) *Attorney, Agent, or Firm* — Alleman Hall McCoy Russell & Tuttle LLP (57) ABSTRACT

Systems and methods for identifying translation pairs from web pages are provided. One disclosed method includes receiving monolingual web page data of a source language, and processing the web page data by detecting the occurrence of a predefined pattern in the web page data, and extracting a plurality of translation pair candidates. Each of the translation pair candidates may include a source language string and target language string. The method may further include determining whether each translation pair candidate is a valid transliteration. The method may also include, for each translation pair that is determined not to be a valid transliteration, determining whether each translation pair candidate is a valid translation. The method may further include adding each translation pair that is determined to be a valid translation or transliteration to a dictionary.

20 Claims, 4 Drawing Sheets

OTHER PUBLICATIONS

Wan, S. et al. "Automatic English-Chinese name transliteration for development of multilingual resources," Proceedings of the 17th international conference on Computational linguistics—vol. 2, Montreal, Quebec, Canada pp. 1352-1356 Year of Publication: 1998.*

Kang, Jaeho et al. "Mining Korean-English Terminologies by Pattern Generation in Internet," KIISE 2007 Fall Conference, Oct. 2003, vol. 30, No. 2, pp. 148-150, 3 pages.

ISA Korea, International Search Report of PCT/US2008/074672, Mar. 24, 2009, 3 pages.

Nagata, et al., "Using the web as a Bilingual Dictionary", Proc. Workshop on Data-driven Methods in Machine Translation, 2001, pp. 8.

Nie, et al., "Cross-Language Information Retrieval based on Parallel Texts and Automatic Mining of Parallel Texts from the Web", SIGIR'99, ACM, 1999, pp. 74-81.

Mitamura, et al., "Keyword Translation Accuracy and Cross-Lingual Question Answering in Chinese and Japanese", EACL 2006 Workshop on Multilingual Question Answering—MLQA06, pp. 31-38.

* cited by examiner

EXAMPLE INDICATOR WORDS IN CHINESE

"的", "和", "之", "与", etc.

FIG. 7

MINING BILINGUAL DICTIONARIES FROM MONOLINGUAL WEB PAGES

BACKGROUND

Bilingual dictionaries are valuable for many applications such as machine translation, cross language information retrieval, and information exchange in electronic commerce. However, current techniques for making bilingual dictionaries require manual input, review, and editing of dictionary entries, which is expensive and time consuming. In addition, dictionaries constructed in this manner cannot be updated in a timely manner as new words appear.

One prior approach to dictionary construction uses an automated translation model that is learned from parallel web documents available via the Internet, i.e., web documents for which exact translations exist in a first language and a second language. The model exploits the common organization of the parallel translations to extract translation pairs from the translated documents, which are used to form a dictionary.

One drawback to such an approach is that it relies upon web documents for which multiple translations are available. Since such documents comprise only a small percentage of the total number of documents available on the Internet, it is difficult to build large, comprehensive dictionaries from this small number of translated documents.

SUMMARY

Systems and methods for identifying translation pairs from web pages are provided. One disclosed method includes receiving monolingual web page data of a source language, and processing the web page data by detecting the occurrence of a predefined pattern in the web page data, and extracting a plurality of translation pair candidates. Each of the translation pair candidates may include a source language string and target language string. The method may further include determining whether each translation pair candidate is a valid transliteration. The method may also include, for each translation pair that is determined not to be a valid transliteration, determining whether each translation pair candidate is a valid translation. The method may further include adding each translation pair that is determined to be a valid translation or transliteration to a dictionary.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
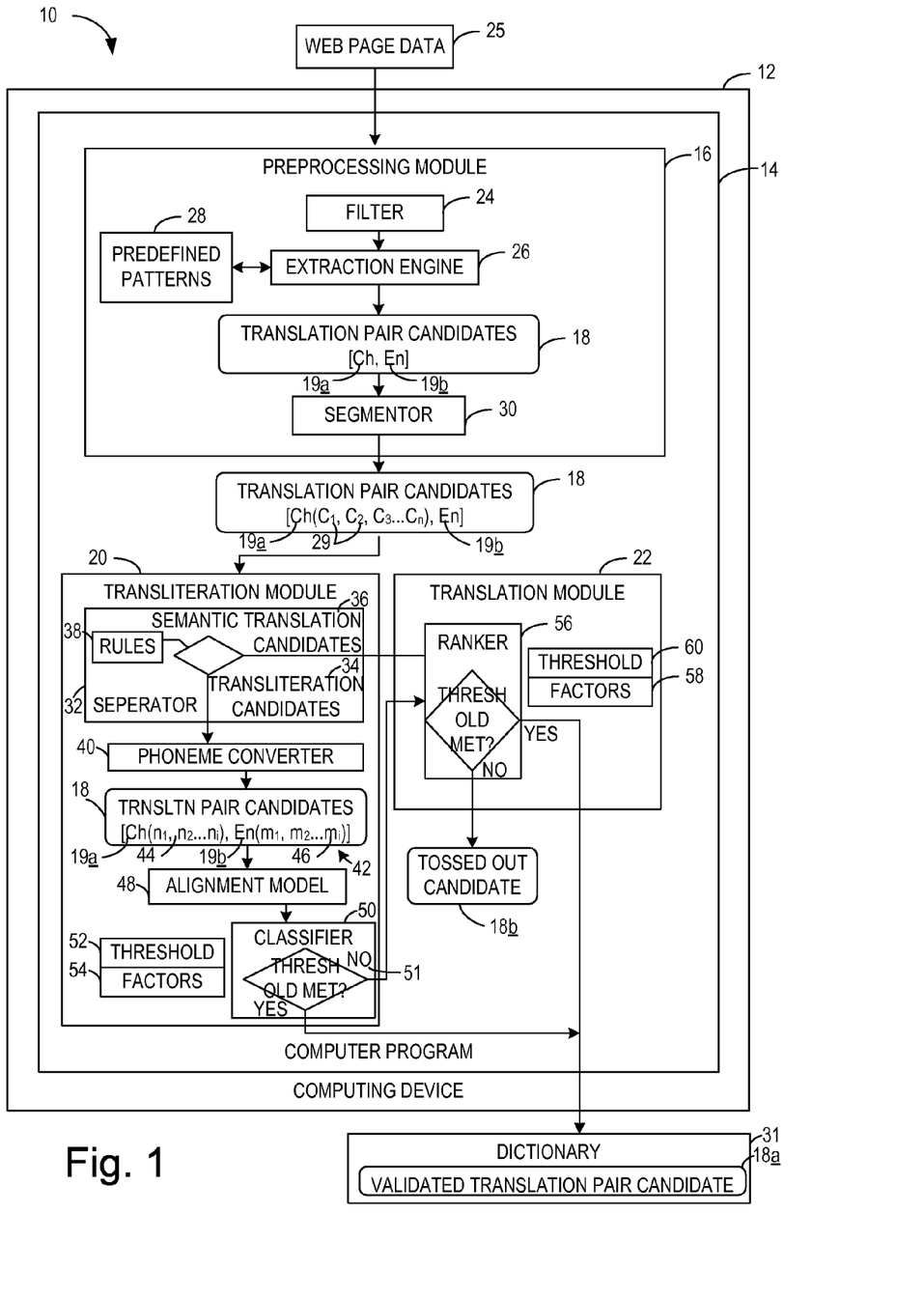
FIG. 1 is a block diagram illustrating a system for identifying translation pairs from web page data.

FIG. 1 illustrates a system 10 including a computing device 12, for identifying translation pairs from web page data 25. The system 10 further includes a computer program 14 configured to be executed on the computing device 12. The computer program 14 may include a preprocessing module 16, a transliteration module 20, and a translation module 22. The preprocessing module 16 may be configured to receive monolingual web page data 25 and process the web page data 25 to produce a plurality of translation pair candidates 18. Typically, each of the translation pair candidates 18 includes a source language string 19a and a target language string 19b. The preprocessing module 16 may include a filter 24 configured to filter the web page data 25 to remove non-textual elements of the web page data 25. The non-textual elements of the web page data 25 may include, for example, HTML tags, XML code, scripts, embedded code, etc. The filter 24 may also be configured to normalize the character encoding to a common standard, such as Chinese Traditional (Big 5), or Unicode (UTF-8). The preprocessing module 16 may further include an extraction engine 26 configured to detect an occurrence of one or more predefined patterns 28 in the monolingual web page data 25, and to extract the plurality of translation pair candidates 18 based on the predefined patterns 28.

It is noted that the monolingual web page data 25 may be any electronic data containing text in a source language that is not wholly translated to another language but may contain sporadic translations into a target language. For example, the monolingual web page 25 may be a Chinese web page data containing text in Chinese source language that is not wholly translated into another language but may contain sporadic English translations of certain Chinese terms in English, with the English translations placed in parentheses immediately following the corresponding Chinese terms.

Figure 4:
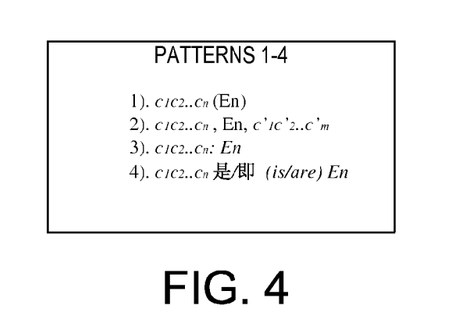
FIG. 4 is a schematic view of a plurality of predefined patterns for extracting translation pair candidates, utilized by the system of FIG. 1.
Figure 5:
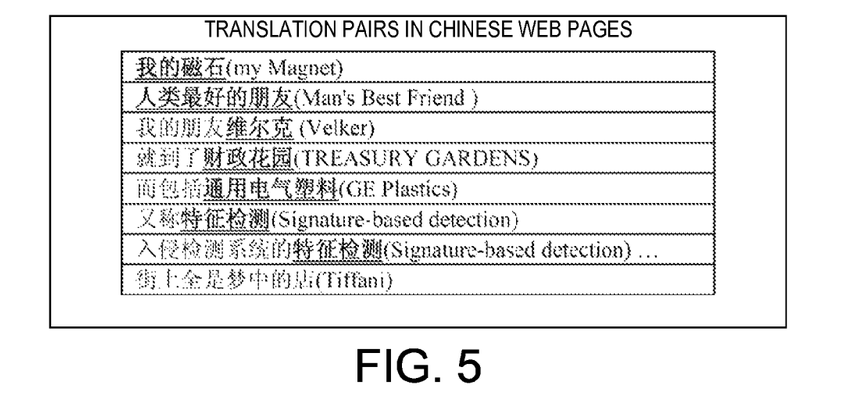
FIG. 5 is a schematic view of example translation pair candidates identified by the system of FIG. 1.

Examples of the predetermined patterns 28 in web page data 25 that are used by the extraction engine 26 of the preprocessing module 16, are illustrated in FIG. 4, and include:

1) $c_1 c_2 \ldots c_n$(En)
2) $c_1 c_2 \ldots c_n$, En, $c_1' c_2' \ldots c_n'$
3) $c_1 c_2 \ldots c_n$: En
4) $c_1 c_2 \ldots c_n$ is/are En where $c_1 c_2 \ldots c_n$ and $c_1' c_2' \ldots c_n'$ refer to a Chinese string, and En refers to an English string, and where is/are may be Chinese translations of "is" or "are". Each detected instance in the text data of the web page data 25 matching the predefined patterns 28 contains a potential English translation of a Chinese word or phrase. FIG. 5 illustrates example instances of Chinese English translation pairs extracted from sample web page data 25, based on the predefined pattern (1) listed above and illustrated in FIG. 4.

It is also noted that the source language and the target language of the monolingual web page data 25 may be any suitable pairing of languages. In the depicted examples, a pictographic language, Chinese, is paired with a phonetic alphabetic language, English.

The preprocessing module 16 may also include a segmentor 30 configured to segment the source language strings 19a and/or the target language strings 19b of the translation pair candidates 18 into one or more words 29. In the illustrated embodiment, only source language words 29 are identified through segmentation, however target language words may also be identified in this manner, where appropriate. Segmentation may be performed, for example, for languages that do not have spaces between characters, in order to provide an indication of word boundaries in a language string. Following segmentation, the translation pair candidates may be referred to as segmented translation pair candidates.

As one example of the segmentation process, segmentor 30 may segment a source language string 19a in Chinese into one or more Chinese words 29, indicated at $C_1, C_2, C_3 \ldots C_n$. In some cases, the word boundaries in the source language string and/or the target language string may be ambiguous. The segmentor 30 may be configured to produce all possible permutations of segmented translation pair candidates from a single translation pair candidate. For example, a source language string of the translation pair candidate in Chinese may be segmented into a first set of Chinese words $C_1', C_2', C_3' \ldots C_n'$, or as a second set of Chinese words $C_1'', C_2'', C_3'' \ldots C_n''$, etc., to produce multiple permutations of segmented translation pair candidates 18. In one implementation, all possible permutations of segmented translation pair candidates may be included as output of the segmentor 30. Alternatively, a predetermined subset of permutations of segmented translation pair candidates may be included as output of the segmentor 30.

The computer program 14 may additionally include a transliteration module 20 configured to receive the plurality of translation pair candidates 18 from the preprocessing module 16, and process the plurality of translation pair candidates 18 to determine whether each translation pair candidate 18 is a valid transliteration candidate, which is a type of valid translation pair candidate 18a, to be added to a dictionary 31.

It is noted, the term "transliteration" as used herein refers to converting a phrase in a source language to a corresponding phrase in a target language based not on semantic clues, but on phonetic clues. The term "semantic translation" as used herein refers to converting a phrase in a source language to a corresponding phrase in a target language based on semantic clues.

The transliteration module 20 may include a separator 32 configured to separate the translation pair candidates 18 into transliteration candidates 34 to be further processed by the transliteration module 20, and semantic translation candidates 36 to be further processed by the translation module 22. Such separation may be based on, for example, one or more predefined rules 38. The predefined rules 38 may include, for example, a frequency-based rule, in which words with a frequency larger than a predefined threshold are separated out as the semantic translation candidates 36; otherwise they are categorized as transliteration candidates 34. The predefined rules 38 may also include other heuristic rules. For example, proper Chinese nouns (e.g., a name of a person, place, or entity) are often transliterated rather than semantically translated. Such proper Chinese nouns may be classified as transliteration units, and are often preceded by a translation unit and followed by a named entity suffix. A named entity suffix is a term for indicating, for example, the title of a person, the type of place, or the type of entity. Example named entity suffixes for proper Chinese nouns include Chinese equivalents of the following English terms: Mr., Mrs., college, company, law firm, etc. Therefore, one example of a rule-based rule 38 is a rule that separates out the transliteration candidates 38 by identifying transliteration units that have a named entity suffix immediately following the transliteration unit.

The transliteration module 20 may also include a phoneme converter 40 for converting the translation pair candidates 18 separated as transliteration candidates 34 into a plurality of phonemes 42 of the transliteration candidates 34. The phonemes 42 are pronunciation units, or phonetic units, of the source language and the target language. For example, a source language string 19a in Chinese, as indicated by Ch, may be converted into one or more Chinese phonemes 44, indicated at $n_1, n_2, n_3 \ldots n_i$. This conversion may be performed, for example, by converting each of the Chinese characters in the Chinese source language string to a phoneme, such as a Pinyin equivalent, using a map (lookup table, etc.) of Chinese characters to Pinyin equivalents. The target language string 19b in English, as indicated by En, may be converted into one or more English phonemes 46 $m_1, m_2, m_3 \ldots m_i$. This conversion may be performed, for example, using an electronic English pronunciation dictionary. Alternatively, English words in an English target language string may be first converted into a plurality of syllables, and each syllable may be decomposed into a plurality of sub-syllables, and each sub-syllable may be then converted to a single corresponding phoneme.

The transliteration module 20 may include an alignment model 48 configured to receive the translation pair candidates 18, which have been converted to source language phonemes $n_i$ and target language phonemes $m_i$, from the phoneme converter 40. The alignment model 48 is further configured to process the received translation pair candidates 18 to determine the probability that the source language string 19a matches the target language string 19b in the translation pair candidate 18. The determination may be based at least in part on the determined probability that each phoneme 44 in the source language string 19a, is a transliteration of a corresponding phoneme 46 in the target language string 19b.

For example, the probability that a Chinese source language string, as indicated by Ch, and an English target language string, as indicated by En, are a transliteration pair, can be calculated using the following equations:

$$P(Ch|En)=\Sigma_A P(Ch,A|En)=\Sigma_A \Pi_i P(Ch_i|En_i)P(n_i|m_i) \approx P(Ch,A^*|En) \quad \text{Equation 1:}$$

$$A^*=\operatorname{argmax}_A P(Ch,A|En)=\operatorname{argmax}_A \Pi_i P(Ch_i|En_i)P(n_i|m_i) \quad \text{Equation 2:}$$

A denotes an alignment between Ch and En, where $A=a_1 a_2 a_3 \ldots a_I$, where $a_i$ denotes an alignment unit, which consists of a Chinese source language alignment unit, as indicated by $Ch_i$, and an English target language alignment unit, as indicated by $En_i$. $Ch_i$ contains i Chinese phonemes, $n_1, n_2, n_3 \ldots n_i$; and $En_i$ contains i English phonemes, $m_1, m_2, m_3 \ldots m_i$. It will be appreciated that lengths of the Chinese phonemes and English phonemes may be different.

P(Ch|En) denotes the probability that the Chinese source language string Ch, and the English target language string En are a transliteration pair.

$\Sigma_A P(Ch, A|En)$ represents the joint probability of (a) the Chinese source language string Ch occurring, and (b) the conditional probability of the alignment A occurring given the English target language string En occurring.

$P(Ch_i|En_i)$ denotes the transliteration probability between the two transliteration alignment units, that is the probability of the source language alignment unit $Ch_i$ occurring given the English target language alignment unit $En_i$ is occurring. $P(Ch_i|En_i)$ may be estimated using a maximum likelihood estimation (MLE) algorithm according to Equations 1 and 2 presented above.

P($n_i|m_i$) denotes the length alignment probability, which is the probability that a source language phoneme $n_i$ is a transliteration of a target language phoneme $m_i$, given $n_i$.

The length probability P($n_i|m_i$) may be assumed to have a uniform distribution and omitted in calculating arg max$_A$ P(Ch,A|En). Alternatively, the length probability P($n_i|m_i$) may be estimated with MLE. In such cases, the alignment probability P(Ch|En) may be calculated with dynamic programming, and an expectation-maximization (EM) algorithm may be used to train the parameters in the alignment model. An example EM algorithm may include the following steps:
1) Initialization: considering each possible alignment unit in the source language is aligned to all the alignment units in the target language whose distance to the source unit is less than 2 units. Then calculate the transliteration probability P(Ch$_i$|En$_i$) between possible alignment units.
2) E-step: Obtain the best alignment according to the alignment model (e.g., equation 2).
3) M-step: Re-estimate the transliteration probabilities between possible alignment units among the best alignment.
4) If the stopping criteria are reached, stop training; otherwise, go to step 2.

Various alignment templates may be used in the alignment model 48 to parse out the source language alignment units (Ch$_i$) and the target language alignment units (En$_i$) Example alignment templates are listed below:
(1) source language alignment unit contains 1 phoneme, target language alignment unit contains 1 phoneme.
(2) source language alignment unit contains 2 phonemes, target language alignment unit contains 1 phoneme; or source language alignment unit contains 1 phoneme, target language alignment unit contains 2 phonemes.
(3) source language alignment unit contains 0 phoneme, target language alignment unit contains 1 phoneme; or source language alignment unit contains 1 phoneme, target language alignment unit contains 1 phoneme.
(4) source language alignment unit contains 2 phonemes, target language alignment unit contains 2 phonemes.

The transliteration module 20 may further include a classifier 50, such as a binary classifier trained by an averaged perceptron algorithm, configured to receive the alignment score from the alignment model 48, and classify whether each translation pair candidate 18 is a valid transliteration pair candidate, which is a type of valid translation pair candidate 18a, based on an output of the alignment model 48, and with reference to one or more classifying factors 54 and a classifying threshold 52 obtained based on the classifying factors 54. The classifier 50 may assign raw scores to the alignment pair candidates 18 for each of the classifying factors 54, and the raw scores for each the classifying factors 54 may be weighted and summed up to give a final score. The final scores for the translation candidates 18 may be ranked. The translation candidate 18 with the highest score may be determined by the classifier 50 as a positive instance. The transliteration candidate 18 determined as a positive instance is considered a valid transliteration candidate, which is a type of the valid translation candidate 18a, and will be added to the dictionary 31.

The translation candidates 18 with scores other than the highest are classified by the classifier as negative instances. The transliteration candidates 18 classified as negative instances will be passed on to the translation module 22 for further processing. In some cases, the classifying threshold 52 may be applied to the final scores determined by the classifier 50 for the translation candidates 18. For example, a translation candidate 18 may only be classified as a valid transliteration candidate if its final score determined by the classifier 50 is above the classifying threshold 52. The classifying threshold 52 may be determined based on a training data set containing a number (such as hundreds or thousands) of validated translation pair candidates.

The following illustrates an illustrative example classifying factors 54 that may be used by the classifier 50:
1) The logarithm of the transliteration probability of transliteration from the English target language string to Chinese source string normalized by the number of alignment units
2) The normalized logarithm of the transliteration probability from English to Chinese
3) The ratio of the number of English alignments and Chinese alignments in the English to Chinese transliteration
4) The ratio of the number of Chinese alignments and English alignments in the Chinese to English transliteration
5) The perplexity of the Chinese source language string with respect to a Chinese transliteration model (this factor may be used to test whether the Chinese contains unusual characters used for transliteration)

The translation module 22 is configured to process each translation pair candidate 18 that is determined not to be a valid transliteration (e.g., when classified as NO at 51 by the classifier 50, or when as separated as semantic translation at 36 by the separator 32) and determine whether each translation pair candidate 18 is a valid translation. The translation module 22 may include a ranker 56 configured to rank each of the translation pair candidates with reference to one or more predefined ranking factors 58 and generate a positive instance output and an negative instance output. In some cases, the output of the ranker 56 may also be based on a ranking threshold 60.

The ranker 56 may be a multiple nested ranker based on an averaged perceptron algorithm. The ranker 56 may be trained to assign a higher score to positive alignment instances, and a lower score to negative alignment instances.

Figure 6:
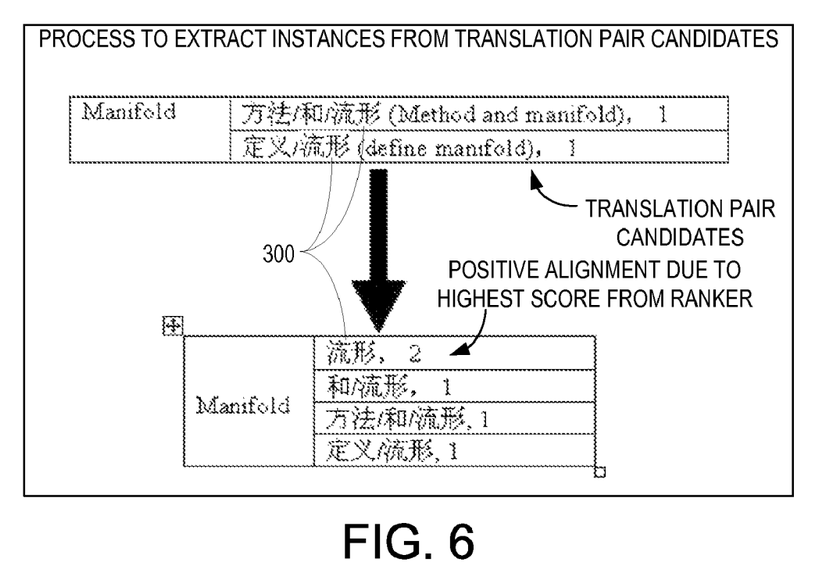
FIG. 6 is a schematic view illustrating a process of extracting instances from translation pair candidates, performed by the system of FIG. 1.

The ranker 56 may first parse out possible alignment units. The ranker 56 may then score all alignment units which share one English phrase, and select the one with the highest score as the positive alignment instance, i.e., the correct or validated translation pair. This process is illustrated in FIG. 6, which shows a highest score of 2 for the English word Manifold and its Chinese equivalent 300. The score of 2 is derived because the English word Manifold appears in two different translation pair candidates that include the Chinese equivalent phrase 300.

In other words, if there are N different English phrases in the training data, each of which can generate a set of alignment instances, the set of alignment instances may be denoted as $S_i$ and the each alignment instance in $S_i$ as $C_{ij}$ The features of instance $C_{ij}$ is denoted as $f_k(C_{ij})$, and the score of $C_{ij}$ is S($C_{ij}$), the averaged perceptron algorithm provides:

$$S(C_{ij}) = \sum_{k=o}^{M} \lambda_k f_k(C_{ij})$$

where $\lambda_k$(k=1, 2, . . . , M) represents the weights of M features and $\lambda_0$ is the bias.

The ranker 56 may be trained using the following algorithm:

Input: training samples, $S_i$, i = 1, 2, 3, ..., N
Output: parameter setting $\lambda_k$
1. Initialization: set $\lambda_0 = 1$, $\lambda_k = 0$, k = 1, 2, 3, ..., M
2. For t = 1 to T
   3. For each training sample $S_i$,
      4. For instances $C_{ij}$ and $C_{il}$ in $S_i$
         If $S(C_{ij}) > S(C_{ij})$ and $C_{ij}$ is negative while $C_{il}$ is positive, then
            5. $\lambda_k^{t+1} = \lambda_k^{t1} + \eta(f_k(C_{il}) - f_k(C_{ij}))$
              k = 0, 1, 2, 3, ..., M 6. $\lambda_k = \dfrac{\sum_{t=0}^{T} \lambda_k^t}{T}$ To deal with the issue of the unbalanced data, a multiple nested ranker may be used. At each step of the training process, instead of using all the negative alignment instances, only a subset of the negative alignment instances may be selected to be included in the training data, so the percentage of positive instances in the training data is larger than that of the whole data set. The training data may then be used to train a new perceptron ranker, which is in turn used to select a new subset of alignment instances for the training of a new ranker at the next step. For example, the top 50% of alignment instances with higher scores may be included in the training data for training the next perceptron ranker.

An example algorithm of the ranker 56 is illustrated below:
Input: training samples, $S_i$, i=1, 2, 3, ..., N
Output: parameter setting for R rankers, $\lambda_{k_k}^r$, r=1, 2, 3, ... R for r=1 to R
   For each training sample $S_i$,
      Select 50% $C_{ij}$ with the highest score in $S_i$
   Train Averaged Perceptron Ranker, and output parameter $\lambda_{k_k}^r$ During translation pair mining, the system may also keep, for example, the top 50% of alignment instances and determine that the remaining alignment instances are incorrect. If the number of remaining pairs is less than 1, the system does not do any cutting. The system may then output the translation pair candidate with the highest score, provided the score is greater than a threshold, as a positive alignment instance.

Figure 7:
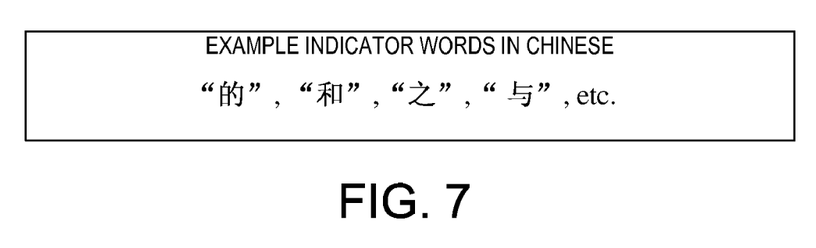
FIG. 7 is a list of example indicator words that may be factors used by the ranker of the system of FIG. 1 to rank translation pair candidates.

Example factors 58 that may be used by the ranker 56 to score alignment instances are given below:
1) relative frequency of the source language alignment unit;
2) length ratio of the target language alignment unit and the source language alignment unit;
3) length of the source language alignment unit;
4) whether translation of the first target language word after reordering is in the alignment unit;
5) number of unique terms before the candidate; and
6) whether the word immediately before the suffix is an indicator word, such as those indicated in FIG. 7.

The positive instances are determined as the validated translation pair candidate 18a and are added to the dictionary 31. The negative instances are tossed out, as indicated by tossed out translation pair candidate 18b.

Figure 2:
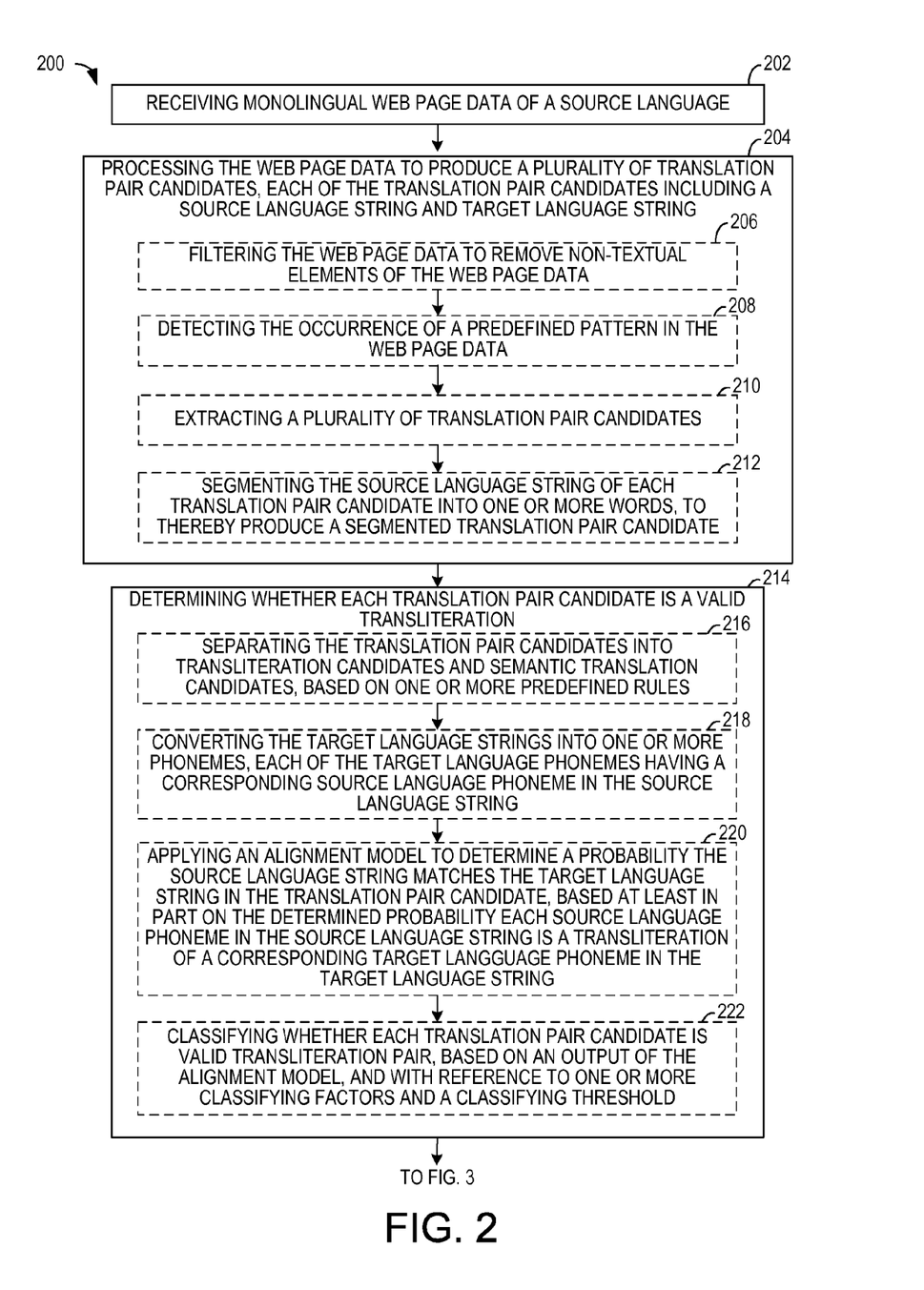
FIG. 2 is a flowchart of an embodiment of a method for identifying translation pairs from web pages.

FIG. 2 illustrates an embodiment of a method 200 for identifying translation pairs from web page data. Method 200 typically includes, at 202, receiving monolingual web page data of a source language.

At 204, the method includes processing the web page data to produce a plurality of translation pair candidates, each of the plurality of translation pair candidates including a source language string and a target language string. The source language string may be in virtually any suitable language, such as a pictographic language such as Chinese, and the target language string may also be any suitable language, such as English.

Processing at 204 may be accomplished at least in part by substeps illustrated at 206-212. At 206, the method may include, filtering the web page data to remove non-textual elements of the web page data. At 208, the method may include detecting the occurrence of a predefined pattern in the web page data, and at 210, extracting the plurality of translation pair candidates, each extracted translation pair candidate being an instance of data within the web page data that matches the predefined pattern. As illustrated in FIG. 4, the predefined pattern may include a source language string and a target language string contained within parentheses, or other suitable pattern. At 212, the method may further include segmenting the source language string of each translation pair candidate into one or more words, to thereby produce a segmented translation pair candidate. It will be appreciated that step 204 and its various substeps are typically performed by preprocessing module 16 of system 10, described above.

At 214, the method may include determining whether each translation pair candidate is a valid transliteration. Determining whether each translation pair candidate is a valid transliteration may further include, at 216, separating the translation pair candidates into transliteration candidates and semantic translation candidates, based on one or more predefined rules, at 218, converting the target language strings into one or more target language phonemes, each of the target language phonemes having a corresponding source language phoneme in the source language string, at 220, applying an alignment model to determine a probability the source language string matches the target language string in the translation pair candidate, based at least in part on the determined probability each source language phoneme in the source language string is a transliteration of a corresponding target language phoneme in the target language string, and at 222, classifying whether each translation pair candidate is valid transliteration pair, based on an output of the alignment model, and with reference to one or more classifying factors and a classifying threshold.

As discussed above in relation to system 10, the predefined classifying factors may be selected from the group consisting of 1) a logarithm of the transliteration probability of transliteration from the source language string to target language string normalized by the number of alignment units; 2) a normalized logarithm of the transliteration probability from the source language to the target language string; 3) a ratio of the number of source language alignments and target language alignments in the source language to target language translation; 4) a ratio of the number of source language alignments and target language alignments in the source language to target language transliteration; and 5) a perplexity of the source language string with respect to a source language transliteration model.

Figure 3:
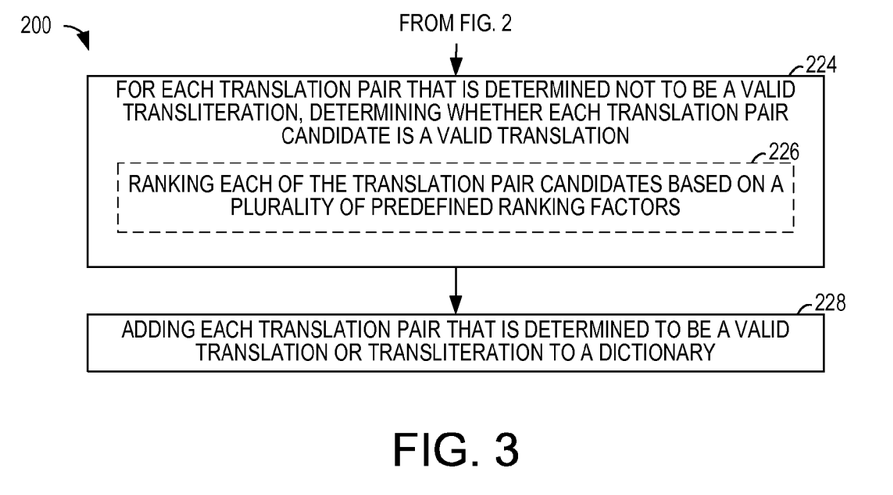
FIG. 3 is a continuation of the flowchart of FIG. 2.

At 224, the method may include for each translation pair that is determined not to be a valid transliteration, determining whether each translation pair candidate is a valid translation. At 226, the method may include ranking each of the translation pair candidates based on a plurality of predefined ranking factors. The ranking may be accomplished at least in part by a multiple nested ranker, and the plurality of ranking factors may be selected from the group consisting of 1) a relative frequency of the source language alignment unit; 2) a length ratio of the target language alignment unit and the source language alignment unit; 3) a length of the source language alignment unit; 4) whether translation of the first target language word after reordering is in the alignment unit; 5) a number of unique terms before the candidate; 6) whether the word immediately before the suffix is an indicator word, in such as those Chinese indicator words illustrated in FIG. 7.

At 228, the method may include adding each translation pair that is determined to be a valid translation or transliteration to a dictionary.

The systems and methods described above may be used to mine translation pair candidates from monolingual web page data, and produce an electronic dictionary comprised of validated translation pair candidates, potentially resulting in time and cost savings over prior manual dictionary construction techniques, and potentially building a more complete dictionary than built with prior automated techniques, since a larger corpus of data may be mined, i.e., monolingual web page data rather than only exact translations of documents available on the web.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing method for identifying translation pairs from web pages, the method comprising, at a computing device:
  receiving monolingual web page data of a source language;
  processing the web page data by:
    detecting the occurrence of a predefined pattern in the web page data;
    extracting a plurality of translation pair candidates, each of the translation pair candidates including a source language string and a target language string;
  determining whether each translation pair candidate is a valid transliteration by:
    classifying whether each translation pair candidate is a valid transliteration pair, based on an output of an alignment model, and with reference to one or more predefined classifying factors and a classifying threshold, wherein the predefined classifying factors are selected from the group consisting of a logarithm of the transliteration probability of transliteration from the source language string to target language string normalized by the number of alignment units; a normalized logarithm of the transliteration probability from the source language to the target language string; a ratio of the number of source language alignments and target language alignments in the source language to target language translation; a ratio of the number of source language alignments and target language alignments in the source language to target language transliteration; and a perplexity of the source language string with respect to a source language transliteration model; and
  adding each translation pair that is determined to be a valid transliteration to a dictionary.

2. The method of claim 1, wherein the source language is Chinese.

3. The method of claim 1, wherein the target language is English.

4. The method of claim 1, wherein the predefined pattern includes a source language string and a target language string contained within parentheses.

5. The method of claim 1, wherein processing further includes:
  prior to detecting the occurrence of a predetermined pattern, filtering the web page data to remove non-textual elements of the web page data.

6. The method of claim 5, wherein processing further includes:
  segmenting the source language string of each translation pair candidate into one or more words, to thereby produce a segmented translation pair candidate.

7. The method of claim 6, wherein determining whether each translation pair candidate is a valid transliteration further includes:
  separating the translation pair candidates into transliteration candidates and semantic translation candidates, based on one or more predefined rules;
  converting the target language strings into one or more target language phonemes, each of the target language phonemes having a corresponding source language phoneme in the source language string; and
  applying the alignment model to determine a probability the source language string matches the target language string in the translation pair candidate, based at least in part on a determined probability each source language phoneme in the source language string is a transliteration of a corresponding target language phoneme in the target language string.

8. The method of claim 1, further comprising:
  ranking each of the translation pair candidates based on a plurality of predefined ranking factors.

9. The method of claim 8, wherein the ranking is accomplished by a multiple nested ranker, and wherein the plurality of ranking factors are selected from the group consisting of a relative frequency of a source language alignment unit; a length ratio of a target language alignment unit and a source language alignment unit; a length of a source language alignment unit; whether translation of a first target language word after reordering is in an alignment unit; a number of unique terms before the candidate; and whether a word immediately before a suffix is a predetermined indicator word.

10. The method of claim 1, further comprising, after classifying whether each translation pair candidate is valid transliteration pair:
  for each translation pair that is determined not to be a valid transliteration, determining whether each translation pair candidate is a valid translation; and adding each translation pair that is determined to be a valid translation to the dictionary.

11. A system for identifying translation pairs from web pages, the system comprising a computer program configured to be executed on a computing device, the computer program including:
a preprocessing module configured to detect an occurrence of a predefined pattern in monolingual web page data of a source language, and to extract a plurality of translation pair candidates, each of the translation pair candidates including a source language string and a target language string; and
a transliteration module configured to process the plurality of translation pair candidates to determine whether each translation pair candidate is a valid transliteration;
wherein the valid transliteration is based on an output of an alignment model, and with reference to one or more predefined classifying factors, wherein the predefined classifying factors are selected from the group consisting of a logarithm of the transliteration probability of transliteration from the source language string to target language string normalized by the number of alignment units; a normalized logarithm of the transliteration probability from the source language to the target language string; a ratio of the number of source language alignments and target language alignments in the source language to target language translation; a ratio of the number of source language alignments and target language alignments in the source language to target language transliteration; and a perplexity of the source language string with respect to a source language transliteration model; and
a translation module to process each translation pair candidate that is determined not to be a valid transliteration, to determine whether each translation pair candidate is a valid translation;
wherein the computer program is configured to add each translation pair candidate that is determined to be a valid transliteration or a valid translation to a dictionary.

12. The system of claim 11, wherein the preprocessing module includes a filter configured to filter the web page data to remove non-textual elements of the web page data.

13. The system of claim 12, wherein the preprocessing module includes an extractor configured to extract translation pair candidates from the filtered web page data.

14. The system of claim 13, wherein the preprocessing module includes a segmentor configured to segment the source language string of each translation pair candidate into one or more source language words, to thereby produce a segmented translation pair candidate.

15. The system of claim 14, wherein the transliteration module includes a separator configured to separate the translation pair candidates into transliteration candidates and semantic translation candidates, based on one or more predefined rules.

16. The system of claim 15, wherein the transliteration module includes a phoneme converter configured to convert the target language strings into one or more target language phonemes, each of the target language phonemes having a corresponding source language phoneme in the source language string.

17. The system of claim 16, wherein the alignment model is further configured to determine a probability the source language string matches the target language string in the translation pair candidate, based at least in part on a determined probability each source language phoneme in the source language string is a transliteration of a corresponding target language phoneme in the target language string.

18. The system of claim 17, wherein the transliteration module includes a classifier configured to classify, via a binary classifier, whether each translation pair candidate is a valid transliteration pair, based on the output of the alignment model, and with further reference to a classifying threshold.

19. The system of claim 18, wherein the translation module includes a ranker configured to rank each of the translation pair candidates based on a plurality of predefined ranking factors.

20. A computing method for identifying translation pairs from web pages, the method comprising, at a computing device:
receiving monolingual web page data of a source language;
processing the web page data to produce one or more translation pair candidates, each translation pair candidate including a source language string and a target language string;
determining whether one or more of the translation pair candidates is a valid transliteration, at least in part by applying an alignment model to determine a probability the source language string matches the target language string in the translation pair candidate, the alignment model being based on an output of the alignment model, and with reference to one or more predefined classifying factors, wherein the predefined classifying factors are selected from the group consisting of a logarithm of the transliteration probability of transliteration from the source language string to target language string normalized by the number of alignment units; a normalized logarithm of the transliteration probability from the source language to the target language string; a ratio of the number of source language alignments and target language alignments in the source language to target language translation; a ratio of the number of source language alignments and target language alignments in the source language to target language transliteration; and a perplexity of the source language string with respect to a source language transliteration model; and
determining whether one or more of the translation pair candidates is a valid semantic translation at least in part by, ranking each of the translation pair candidates based on a plurality of predefined ranking factors, and determining whether a rank of each translation pair candidate is above a predetermined threshold.

* * * * *